United States Patent
Spanos et al.

(10) Patent No.: US 9,836,908 B2
(45) Date of Patent: Dec. 5, 2017

(54) SYSTEM AND METHOD FOR SECURELY RECEIVING AND COUNTING VOTES IN AN ELECTION

(71) Applicant: Blockchain Technologies Corporation, New York, NY (US)

(72) Inventors: Nikolaos Spanos, New York, NY (US); Andrew R. Martin, New York, NY (US); Eric T. Dixon, North Bergen, NJ (US)

(*) Notice: Subject to any disclaimer, the term of this patent is extended or adjusted under 35 U.S.C. 154(b) by 4 days.

(21) Appl. No.: 14/820,530

(22) Filed: Aug. 6, 2015

(65) Prior Publication Data

US 2016/0027229 A1 Jan. 28, 2016

Related U.S. Application Data

(63) Continuation-in-part of application No. 14/809,062, filed on Jul. 24, 2015.

(60) Provisional application No. 62/029,409, filed on Jul. 25, 2014, provisional application No. 62/090,370, filed on Dec. 11, 2014, provisional application No. 62/112,130, filed on Feb. 4, 2015, provisional application No. 62/170,131, filed on Jun. 3, 2015, provisional application No. 62/185,613, filed on Jun. 27, 2015.

(51) Int. Cl.
| | |
|---|---|
| *G06F 21/78* | (2013.01) |
| *G07C 13/00* | (2006.01) |
| *H04L 9/32* | (2006.01) |
| *G06F 21/64* | (2013.01) |

(52) U.S. Cl.
CPC ............ *G07C 13/00* (2013.01); *H04L 9/3239* (2013.01); *G06F 21/64* (2013.01); *G06Q 2220/10* (2013.01); *G06Q 2230/00* (2013.04); *H04L 9/3247* (2013.01); *H04L 2209/38* (2013.01); *H04L 2209/463* (2013.01)

(58) Field of Classification Search
None
See application file for complete search history.

(56) References Cited

U.S. PATENT DOCUMENTS

| | | | | |
|---|---|---|---|---|
| 2002/0074399 | A1* | 6/2002 | Hall ........................ | G07C 13/00 235/386 |
| 2012/0179514 | A1* | 7/2012 | Cohen .................... | G07C 13/00 705/12 |
| 2015/0332283 | A1* | 11/2015 | Witchey ............... | G06Q 30/018 705/3 |

* cited by examiner

*Primary Examiner* — John Hayes
*Assistant Examiner* — Jason Fenstermacher
(74) *Attorney, Agent, or Firm* — James M. Smedley LLC; James Michael Smedley, Esq.

(57) ABSTRACT

The present invention generally relates to blockchain technology. Specifically, this invention relates to adapting blockchain technology for the storage of voting data in an electronic voting system. The system includes a distributed network of voting machines in communication with each other. Each voting machine has a barcode scanner, a network communications device and a computer system running a voting client. Votes are received through the barcode scanner or a voter interface system and stored securely on a blockchain. The tally for various candidates in the election is updated and stored as each vote is received and counted. This creates an auditable trail of votes and the tally which can be used to detect, correct, and prevent fraud and error in the vote counting process.

6 Claims, 10 Drawing Sheets

SYSTEM AND METHOD FOR SECURELY RECEIVING AND COUNTING VOTES IN AN ELECTION

RELATED APPLICATIONS

The present application is a continuation in part of and claims priority to non-provisional U.S. patent application Ser. No. 14/809,062 entitled "System and Method for Creating a Multi-Branched Blockchain with Configurable Protocol Rules" filed Jul. 24, 2015 which is currently pending and which, in turn, claims priority from provisional application No. 62/029,409 entitled "System And Method For Database For Self-Actuating Contracts And Other Data" filed Jul. 25, 2014, provisional application No. 62/090,370 entitled "Use of Blockchain Database To Enhance Security of Support Secure Electronic Voting and Election Result Tabulation" filed Aug. 6, 2014, provisional application No. 62/112,130 entitled "System And Method For Blockchain-Type-Based Search Engine Database Within An Internet Browser Supporting A User Affinity Program" filed Feb. 4, 2015, provisional application No. 62/170,131 entitled "Retailer-Captive Blockchain-Derivative System For Hosting Secure and Non-Counterfeit Transactions Within A Retailer's Customer Affinity Program" filed Jun. 3, 2015, and provisional application No. 62/185,613 entitled "System And Method For Blockchain-Inspired Database Allowing Remote Access To Medical Records" filed Jun. 27, 2015, the contents of which are incorporated by reference herein in their entirety.

FIELD OF THE INVENTION

The present invention generally relates to blockchain technology. Specifically, this invention relates to adapting blockchain technology for the storage of voting data in an electronic voting system. The system includes a distributed network of voting machines in communication with each other. Each voting machine has a barcode scanner, a network communications device and a computer system running a voting client. Votes are received through the barcode scanner or a voter interface system and stored securely on a blockchain. The tally for various candidates in the election is updated and stored as each vote is received and counted. This creates an auditable trail of votes and the tally which can be used to detect, correct, and prevent fraud and error in the vote counting process.

BACKGROUND OF THE INVENTION

Blockchain technology is most widely known as the technology behind the popular cryptocurrency, Bitcoin. A blockchain creates a history of data deposits, messages, or transactions in a series of blocks where each block contains a mathematical summary, called a hash, of the previous block. This creates a chain where any changes made to a block will change that block's hash, which must be recomputed and stored in the next block. This changes the hash of the next block, which must also be recomputed and so on until the end of the chain.

Although the hash, or mathematical summary, is simple to compute, there are rules imposed which require the value of the hash to be below a certain threshold value. In addition, the hash is based on a special type of mathematical function that is not reversible; you cannot predict what input can be used to produce the desired output. A valid hash is found by repeatedly adjusting a changeable value in the block, and recalculating the hash until it meets the validity requirements. The freely changeable value is called the nonce. The unpredictable nature of the hash considerably increases the difficulty of finding a nonce that produces a valid hash of the block. Typically, trillions of different nonces must be tried before a valid hash is found. Therefore, changing the value of previously stored data in the blockchain is computationally expensive, although not impossible.

The security of a blockchain is further increased by implementing it on a distributed network. This means a large number of users all have access to the blockchain and are all attempting to add blocks to the end of the chain by finding a nonce that produces a valid hash for a given block of data. When two blocks are found that both claim to reference the same previous block, a fork in the chain is created. Some users in the network will attempt to find the next block on one end of the fork while other users will work from the other end of the fork. Eventually one of the forks will surpass the other in length, and the longest chain is accepted by consensus as the valid chain. Therefore, anyone who attempts to change a block must not only re-find a valid hash for each subsequent block, but must do it faster than everyone else working on the currently accepted chain. Thus, after a certain number of blocks have been chained onto a particular block, it becomes prohibitively costly to try to change that block.

Blockchains on a distributed network with sufficiently restrictive rules for creating valid blocks are fairly secure against unauthorized changes to the data stored in them. This makes blockchains particularly useful for recording financial transactions. However, the blockchain has not been properly adapted for use in a voting system, and a voting system has not yet been created which leverages the advantages of blockchain within a larger electronic voting system to solve traditional problems related to fraud in voting systems.

Therefore, there is a need in the art for a system and method for a voting system that prevents fraud in the counting process by leveraging and adapting blockchain technology to a distributed voting system.

SUMMARY OF THE INVENTION

Accordingly, it is an object of the present invention to provide a system and method that collects business reviews in a central database which can then be accessed by multiple external business review providers thereby enabling an efficient proliferation of those business reviews.

According to an embodiment of the present invention, a voting system comprises: one or more voting machines connected to each other by network connections to form a distributed network; wherein each of said one or more voting machines comprises: a computer processor; a non-volatile computer-readable memory; a scanner configured to read data from barcodes and/or voting ballots; and a network interface; wherein the non-volatile computer-readable memory is configured with computer instructions configured to: receive a private key and public key pair from a voter, receive voting data comprising one or more votes for one or more candidates in an election, use said private key to digitally sign said voting data to produce signed voting data, and broadcast said signed voting data with said public key to a distributed network, store said signed voting data with said public key on a blockchain database managed by the one or more voting machines forming said distributed network.

According to an embodiment of the present invention, said computer instructions are further configured to: store voting data with said public key in a voting block on a voting blockchain; update a voting count according to said voting data; store said voting count in a counting block on a counting blockchain, wherein each counting block also stores a hash of the voting block storing the voting data which was used to update the voting count, the result of which is stored in the counting block.

According to an embodiment of the present invention, said computer instructions are further configured to: store, in a voter block which is a fork block of a slidechain, voter data identifying the voter and elections in which said voter is allowed to cast votes, store voting data from said voter in a voting block which is a slidechain root block storing a voter hash of said voter block, wherein said voter block also stores a voting hash computed from data in said voting block, accept the longest chain on said slidechain as a valid chain and accept as valid a chain where any voter block stores a voting hash of a voting block which, in turn, stores a voter hash of said any voter block.

According to an embodiment of the present invention, said computer instructions are further configured to: update a voting count according to said voting data; store said voting count in a counting block on a counting chain which is a fork chain of said slidechain, wherein each counting block in said counting chain also stores a hash of an immediately preceding counting block.

According to an embodiment of the present invention, said computer instructions are further configured to: store, in a voter block which is a fork block of a slidechain, voter data identifying the voter and elections in which said voter is allowed to cast votes, create a slidechain root block storing a voter hash of said voter block, store, in said voter block, a root hash computed from data in said root block, store said voting data in a voting block, store said root hash in said voting block, and accept the longest chain on said slidechain as a valid chain and accept, as valid, a chain where any voter block stores a root hash of a root block which, in turn, stores a voter hash of said any voter block.

According to an embodiment of the present invention, said computer instructions are further configured to: update a voting count according to said voting data; store said voting count in a counting block on a counting chain which is a fork chain of said slidechain, and wherein each counting block in said counting chain also stores a hash of an immediately preceding counting block.

According to an embodiment of the present invention, a method of securing voting data comprises the steps of: receiving voting data produced by a voter; receiving a private key and public key corresponding to said voter; signing the voting data with said private key to produce signed voting data; storing the signed voting data in a voting block on a voting blockchain; updating a voting count based on said voting data; storing said voting count in counting block of a counting blockchain, wherein the counting block a has of an immediately preceding block in the counting blockchain and stores a voting hash of the voting block containing the voting data used to update the voting count stored in the counting block.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED SPECIFICATION

The present invention generally relates to blockchain technology. Specifically, this invention relates to adapting blockchain technology for the storage of voting data in an electronic voting system. The system includes a distributed network of voting machines in communication with each other. Each voting machine has a barcode scanner, a network communications device and a computer system running a voting client. Votes are received through the barcode scanner or a voter interface system and stored securely on a blockchain. The tally for various candidates in the election is updated and stored as each vote is received and counted.

This creates an auditable trail of votes and the tally which can be used to detect, correct, and prevent fraud and error in the vote counting process.

The voting system described herein is designed to prevent fraud and error in the vote counting process and assumes all inputs to the system are valid. The voting system does not attempt to guarantee that each human voter is assigned only one voter ID in the system and does not attempt to guarantee that the voter ID used to cast a vote actually belongs to the person using it, nor that the voter ID used to cast a vote actually belongs to an existing human voter at all. The voting system relies on whatever identity verification system is used for the state, district, or municipality where the voting system is used. Once votes are entered into the voting system described herein, they are stored securely and irreversibly to guarantee that votes can be quickly and accurately verified and counted. Rather than waiting until the election is over to count votes, the voting system allows votes to be counted in real time as the election is ongoing. According to to one embodiment of the present invention, a customized blockchain called a slidechain is used to store votes and count data. The slidechain is described in the parent application (U.S. patent application Ser. No. 14/809, 062) and the relevant parts are included below for convenience.

Figure 1:
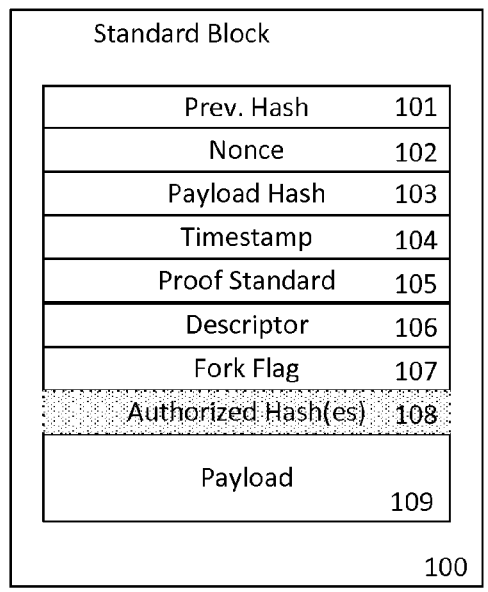
FIG. 1 is a diagram of a standard block in a slidechain according to an embodiment of the present invention.

According to an embodiment of the present invention, FIG. 1 shows the data structure for a standard block of data in the slide chain. Previous hash 101 is the result of a non-reversible mathematical computation using data from the previous block as the input. According to one embodiment the computation used is a SHA256 hash function. One of ordinary skill in the art would recognize that any suitable hash function could be used without departing from the spirit and scope of the present invention. The hash function is designed so that any change to the data in the previous block results in an unpredictable change in the hash of that block. Previous hash 101 is what creates the link between blocks, chaining them together to form the slidechain.

When calculating the hash 101 for the previous block, it must meet certain criteria defined by data stored as the proof standard 105. In one embodiment, this proof standard 105 is simply a number that the calculated hash must be less than. However, because the output of the hashing function is unpredictable, it cannot be determined, before the hash is calculated, what input will result in an output that is less than the proof standard 105. The nonce 102 is used to vary the data content of the block, allowing for a large number of different outputs to be produced by the hash function in pursuit of an output that meets the proof standard 105. This makes it computationally expensive to produce a valid block with a nonce 101 that produces a hash value meeting the criteria of the proof standard 105.

The payload hash 103 is a simple hash of the data in the payload 109 and does not have to meet any proof standard. However, the payload hash is included as part of the input when the hash is calculated for the purpose of storing as the previous hash 101 of the next block. The timestamp 104 tells what time the block was created within a certain range of error. According to one embodiment of the present invention, the distributed network of users checks the timestamp 104 against their own known time and will reject any block that seems to have a bogus timestamp 104. The descriptor 106 describes the size and/or data structure of the payload 109. For a variable size payload 109, the descriptor 106 may indicate the index of the first byte in the payload 109 and the size of the payload 109. The descriptor 106 may also store other information relevant to the interpretation of the payload 109.

The fork flag 107 is an indicator used to determine whether a fork is allowed from this block. The authorized hashes 108 indicate which blocks, identified by a hash, are allowed to chain off of this block. According to one embodiment, the authorized hashes 108 are only stored as part of the block if the fork flag 107 is set. In another embodiment, a single authorized hash 108 is present regardless of whether the fork flag 107 is set, but the authorized hash 108 data may be zeroed out or ignored when the fork flag 107 is not set. According to another embodiment, the number of hashes stored as authorized hashes 108 is flexible. The number of authorized hashes 108 stored may be tracked in the descriptor 106, or a flexible data structure for storing authorized hashes 108 may be used to store a variable number of authorized hashes 108.

The payload 109 is the data stored in the block, which may relate to voting, transactions, ownership, data access records, document versioning, or any kind of data that can be stored. The payload 109 may be a fixed size or a flexible size, and provides the input for the hash that produces the payload hash.

One of ordinary skill in the art would recognize there are a variety of different proof standards that could be used. The proof standard could be based on proof of work, such as hash value requirements, proof of stake, such as a key or other indicator of consensus, or any other kind or proof of consensus. The proof standard may be applied as a rule that requires a hash value to be less than the proof standard, more than the proof standard, or have a required bit sequence or a required number of leading or trailing zeroes. Any proof standard may be used without departing from the spirit and scope of the present invention.

The hash algorithms used for the previous hash 101, the payload hash 103, or the authorized hash may be all of the same type or of different types. Hash functions that could be used include MD5, SHA-1, SHA-224, SHA-256, SHA-384, SHA-512, SHA-512/224, SHA-512/256, SHA-3 or any suitable hash function resistant to pre-image attacks. There is also no requirement that a hash be computed only once. The results of a hash function may be reused as inputs into another or the same hash function again multiple times in order to produce a final result. One of ordinary skill in the art would recognize that any hash function could be used to compute the required hashing without departing from the spirit and scope of the present invention.

Figure 2:
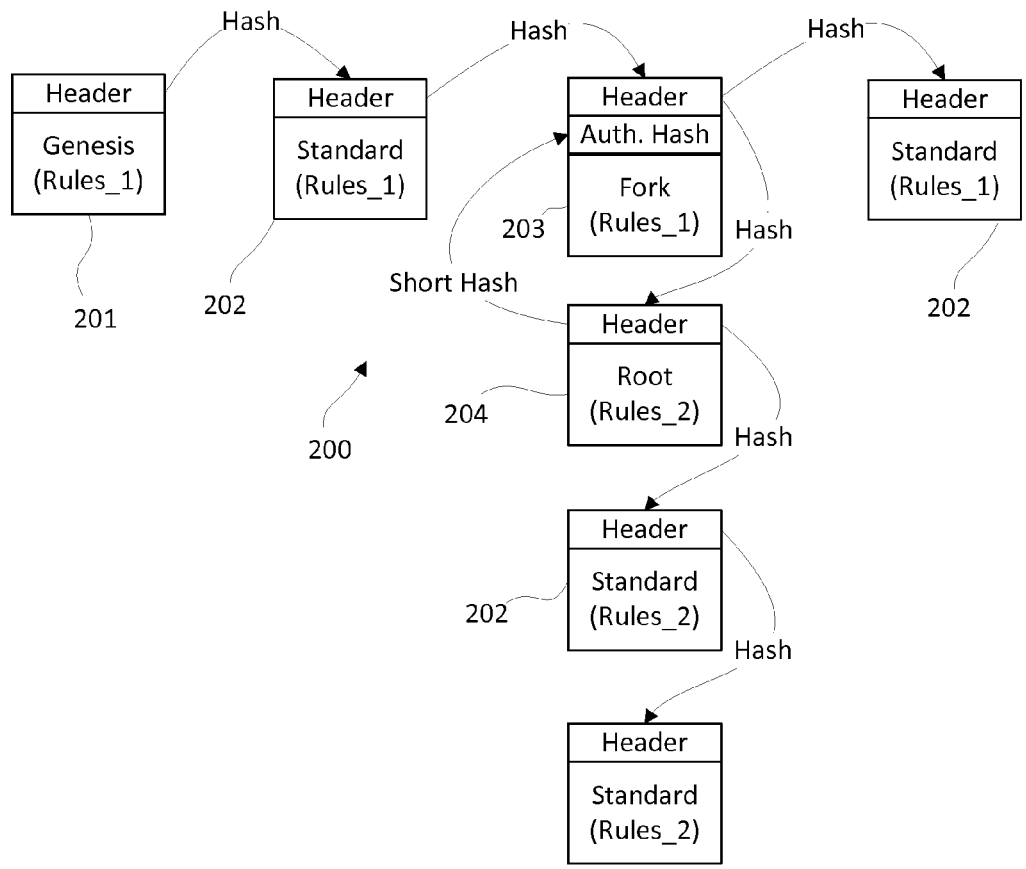
FIG. 2 is a diagram of a slidechain with a forked chain that has a different set of rules applied to it than the original blockchain according to an embodiment of the present invention.

FIG. 2 shows a simple diagram illustrating a slidechain 200 with a single fork. The genesis block 201 is a special block that begins the slidechain 200; it is different from the other blocks because it is the first block in the chain, and thus cannot include a hash of a previous block. The genesis block 201 marks the beginning of the genesis chain. The protocol, that governs how the genesis chain grows, what data it stores, how forks are created, and how block and chain validity are verified is indicated by the Rules_1 label inside each block in the genesis chain. The Rules_1 protocol is the default set of rules that allows for the creation of forks and the modification of rules in those forks. Notice that the Rules_1 protocol still applies to blocks in the genesis chain even after a fork block 203 creates a fork chain where the Rules_2 protocol applies.

The fork block 203 allows the chain to be forked such that both the genesis chain and the fork chain are considered valid chains. Normally, in a blockchain, all forks are eventually ignored and considered invalid except the one representing the longest chain. The fork block 203 is special because it works like a standard block, but additionally includes a reference identifying the first block, or root block 204, in the valid fork. In one embodiment of the present invention, the new protocol, Rules_2, is stored as the payload of the fork block and applied to the root block 204 and each subsequent standard block that chains from the root block 204. In another embodiment, the new Rules_2 protocol is stored in the payload of the root block 204 itself, and is applied to each standard block that chains from the root block 204. In either case, any subsequent block that is chained from either the genesis chain, where Rules_1 applies, or the fork chain, where Rules_2 applies, can be another fork block creating yet another valid chain fork.

The Rules_1, Rules_2, and other protocols are not defined by this specification, but defined by users of the system at runtime. These protocols are customizable based on a scripting, or programming language. According to one embodiment, a new protocol can only be defined for a forked chain and the original protocol remains fixed and applied to the genesis chain. In another embodiment, the genesis chain protocol itself can be modified or updated and applied to every future standard block that chains off the genesis chain. This new base protocol would ideally be backwards compatible with the original genesis chain protocol so that all previous data is not rendered obsolete. The ability to update the protocol and create new protocols gives slidechain the flexibility to adapt to any future technological need where a blockchain is useful.

Figure 3:
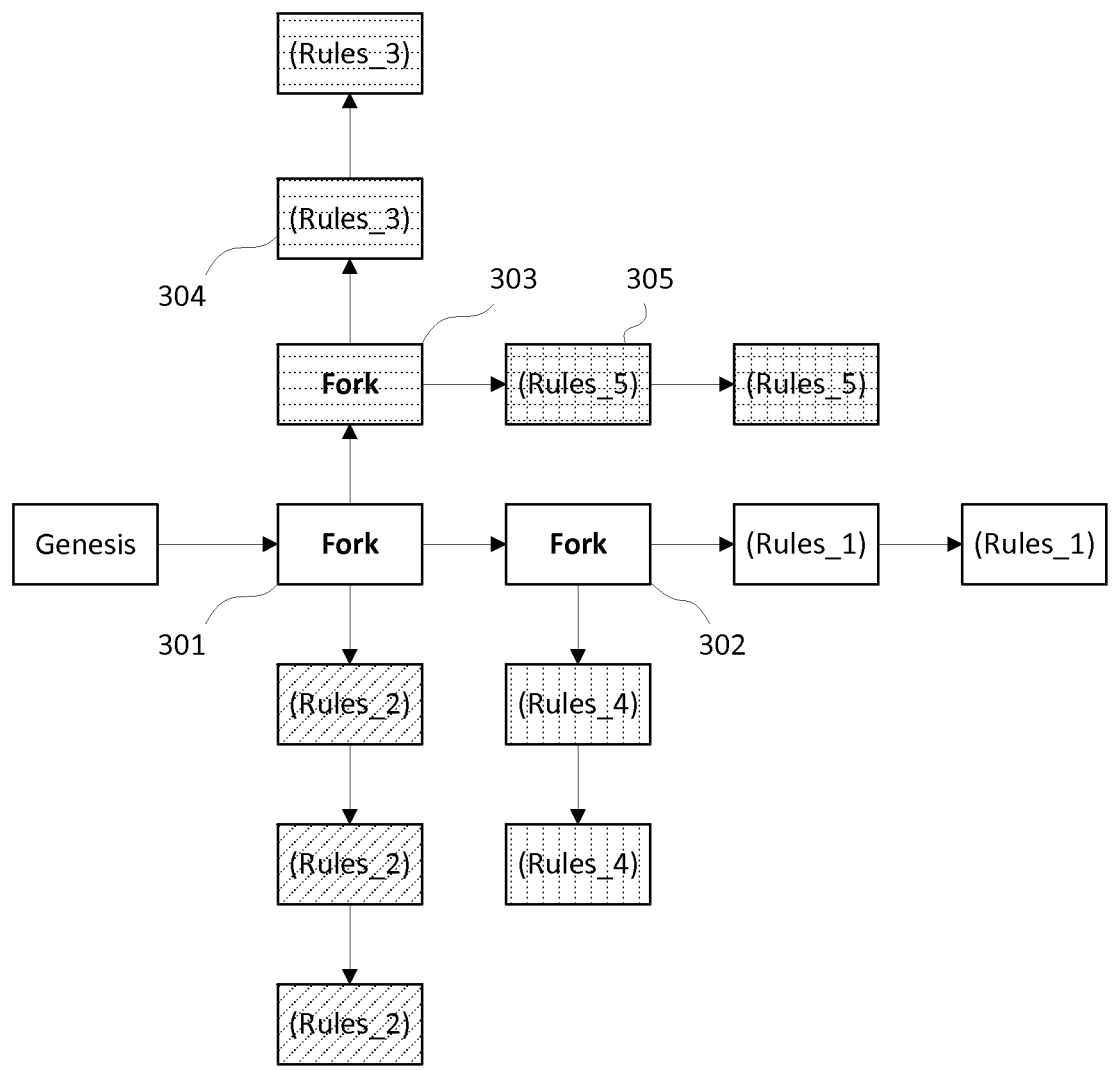
FIG. 3 is a diagram of a slidechain with multiple forks where each new chain has a different protocol or set of rules that apply according to an embodiment of the present invention.

According to an embodiment of the present invention shown in FIG. 3, the slidechain can have multiple forks. Each forked chain is pattern coded in FIG. 3 to visually indicate that the same protocol rules apply to blocks with the same pattern fill. The genesis chain, including the genesis block is filled with plain white. Two consecutive fork blocks, 301 and 302, are shown on the genesis chain. The first fork block 301 begins a forked chain that applies the Rules_2 protocol. The second fork block 302 immediately following the first fork block creates a new forked chain that applies a different Rules_4 protocol. There is no limit to the number of fork blocks or the frequency of fork blocks in the genesis chain. According to one embodiment of the present invention, every block in the genesis chain could conceivably be a fork block. However, it is possible for the protocol of a forked chain to impose its own rules for the creation of additional fork blocks on that forked chain. If a chain that does not recognize the validity of multiple branches is required for a particular application, a customized protocol that disallows forking can be created.

According to an embodiment of the present invention, a forked block may allow for more than one fork to chain from it. The first fork block 301 illustrates this with a fork chain applying Rules_2 attached beneath it and the fork chain applying Rules_3 chaining above it. In order for a fork block to allow for multiple forks, it must store a reference to the root block for each chain that chains from it. This requires a section in the block for authorized hashes that can store more than one authorized has corresponding to a root block. According to one embodiment of the present invention, the protocol rules for each chain are stored in the root block of each forked chain, and not the fork block itself. In another embodiment, the protocol rules for multiple forks are stored in the fork block itself, with an identifier that references the root block to which the protocol rules apply.

According to an embodiment of the present invention, the first block in a forked chain may also be a fork block itself. This is illustrated in FIG. 3 by the third fork block 303. The first fork block 301 creates a forked chain with a Rules_3 protocol and the third fork block 301, which is the first block in the Rules_3 chain, is also a fork block creating a forked chain to the right with a Rules_5 protocol. According to one embodiment of the present invention, the chain rule set for each chain is stored in the first block of the chain fork. Therefore, the Rules_3 protocol would be stored in the third fork block 303 and the Rules_5 protocol is stored in the root block 305. According to another embodiment of the present invention, the fork block stores the protocol rules for the forked chain. In this embodiment, the first fork block 301 would store the Rules_3 protocol and the thirds fork block 303 stores the Rules_5 protocol.

The language used for defining the protocol rules for a forked chain at runtime can be a known computer programming or scripting language, such as, Python, Ruby, Perl, JavaScript, PHP, Scheme, VBScript, Java, Microsoft .Net, C++, C#, C, or a custom-created language for defining the protocol rules. One of ordinary skill in the art would recognize that any suitable language can be used for defining runtime protocols for forked chains without departing from the spirit and scope of the present invention.

Under normal circumstances, blockchains naturally fork from time to time. However, only one branch of the chain in a standard blockchain can be considered valid. Consensus on which chain is valid is achieved by choosing the longest chain, which represents the chain with the most work put into completing it. In order to allow for forked chains without allowing accidental forks in the chain, there must be some mechanism by which valid forks can be verified, and invalid forks can be ignored.

Figure 4:
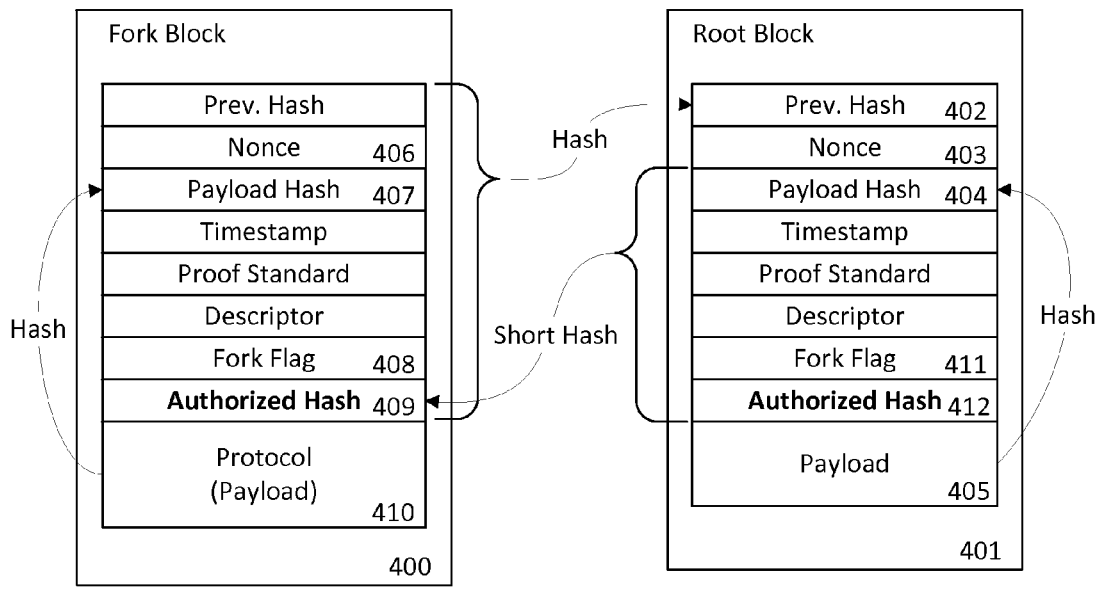
FIG. 4 is a diagram illustrating how a fork block interconnects with the root block of a forked chain according to one embodiment of the present invention.

FIG. 4 illustrates how the fork block 400 is interconnected with the first block in an intentional fork to create a valid fork chain. Each block in the blockchain contains a hash of the immediately preceding block stored in the previous hash 402. This creates a link going back through the chain from each block and is a key component to making it prohibitively difficult to modify the chain. The first block in a valid intentional fork is called the root block 401. Therefore the root block 401 naturally contains in its previous hash 402 a link to the fork block 400. In order to distinguish valid intentional forks from invalid unintentional forks, a hash representing the root block 401 is also stored in the fork block 400. This creates a two way link where the fork block 400 and the root block 401 each contain a hash reference to the other.

According to an embodiment of the present invention, the root block 401 is partially created before the fork block 400 is created. The previous hash 402, which will come from the fork block 400, and the nonce 403 are left unspecified at this point. A payload hash 404 is created from the data stored in the payload 405. The payload hash 404 and all the data of the root block 401, except the previous hash 402 and the nonce 403, are used to compute a short hash, which is stored as the authorized hash 409 of the fork block 400. Excluding the previous hash 402 from the short hash prevents the situation of having mutually dependent hashes with no known way to find a solution. Excluding the nonce 403 is required because the nonce 403 will later be changed in determining a valid hash for the root block 401 after the previous hash 402 is determined from the fork block 400, which does not yet exist at this point.

According to one embodiment of the present invention, the protocol 410 rules that apply to the fork chain beginning with the root block 401 are stored in the fork block payload. A hash is then computed based on the payload and stored as the payload hash 407. The fork flag 408 is set in the fork block to indicate a valid fork branching from the fork block 400. The authorized hash 409, which represents the root block 401, is included along with the payload hash 407 and the rest of the fork block data in computing a valid hash for the fork block 400. This is done by repeatedly adjusting the fork block nonce 406 until the resulting hash meets the required proof standard.

Once the fork block hash is computed and stored as the previous hash 402 of the root block, a valid root block hash can then be computed by repeatedly adjusting the root block nonce 403 until a hash is produced that meets the required proof standard. Because the previous hash 402 and the nonce 403 of the root block are not included in the short hash, they can safely be modified without changing the authorized hash 409 in the fork block 400. However, any changes to the data used to compute the short hash will cause a mismatch between the short hash and the authorized hash stored in the fork block 400, breaking the link between the fork block 400 and the root block 401.

According to an embodiment of the present invention, additional rules are imposed to prevent unauthorized forks from being recognized. For example, somebody might try to make an exact copy of the root block in order to fake an authorized fork. However, the system is configured to ignore exact copies of blocks and treat them as the same block. Exact copies can be detected by comparing the block hash or the short hash between two blocks that both reference the same previous block. The block hash is based at least on the previous hash, nonce, payload hash, timestamp, proof standard, descriptor, fork flag, and optionally the authorized hash, when present. Any blocks that try to chain off the copy of the root block are simply treated as chaining off the original root block, creating a fork that is indistinguishable from an unauthorized fork. In dealing with unauthorized forks, the longest chain is considered valid.

According to an embodiment of the present invention, the root block may also be a fork block. This is called a root fork. If the fork flag 411 in the root block 401 is set, then an authorized hash is stored identifying a second root block that begins a valid fork. When a root block is a fork block, the second root block must be created first. The short hash of the second root block is stored as the authorized hash 412 in the root fork block. The root fork short hash can then be computed and stored as the authorized hash 409 of the fork block 400. Once the fork block is created, the block hashes for the fork block, the root fork block, and the second root block can then be computed in the required order, as described above.

Figure 5:
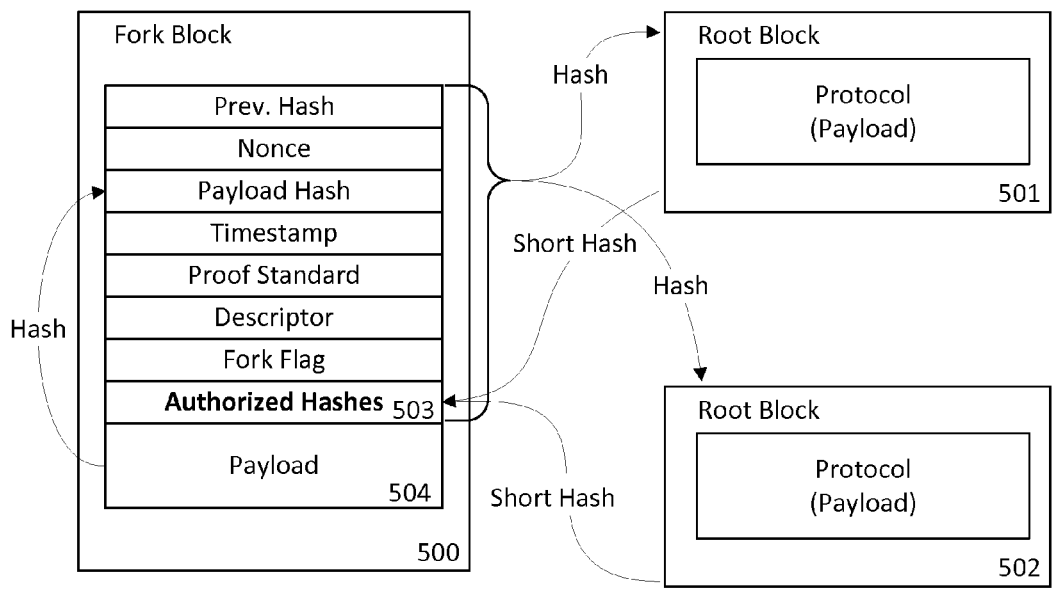
FIG. 5 is a diagram illustrating how a standard block becomes a fork block and interconnects with the multiple root blocks of forked chains according to one embodiment of the present invention.

According to an embodiment of the present invention shown in FIG. 5, a fork block 500 may store more than one authorized hash to create multiple authorized forks from a single fork block 500. The authorized hashes 502 are stored in a flexible structure that allows storage of one or more short hashes corresponding to one or more root blocks. The protocol rules for each valid fork may be stored in the fork block payload 504, or in the root blocks 501 and 502 for each authorized fork chain respectively.

When a slidechain forks, the authorized root block referenced in the fork block represents one side of the fork. The other side of the fork is determined by the standard rule for a blockchain, where the longest blockchain is considered the valid chain and all other forks are abandoned. For example there may be three blocks that all reference a fork block as their previous hashes. The root block which has a short hash that matches the authorized hash in the fork block is automatically recognized as valid regardless of how long the chain from that root block is. Between the remaining two chains, the longest chain is considered the second valid chain and the shorter chain is abandoned by the distributed network.

Figure 6:
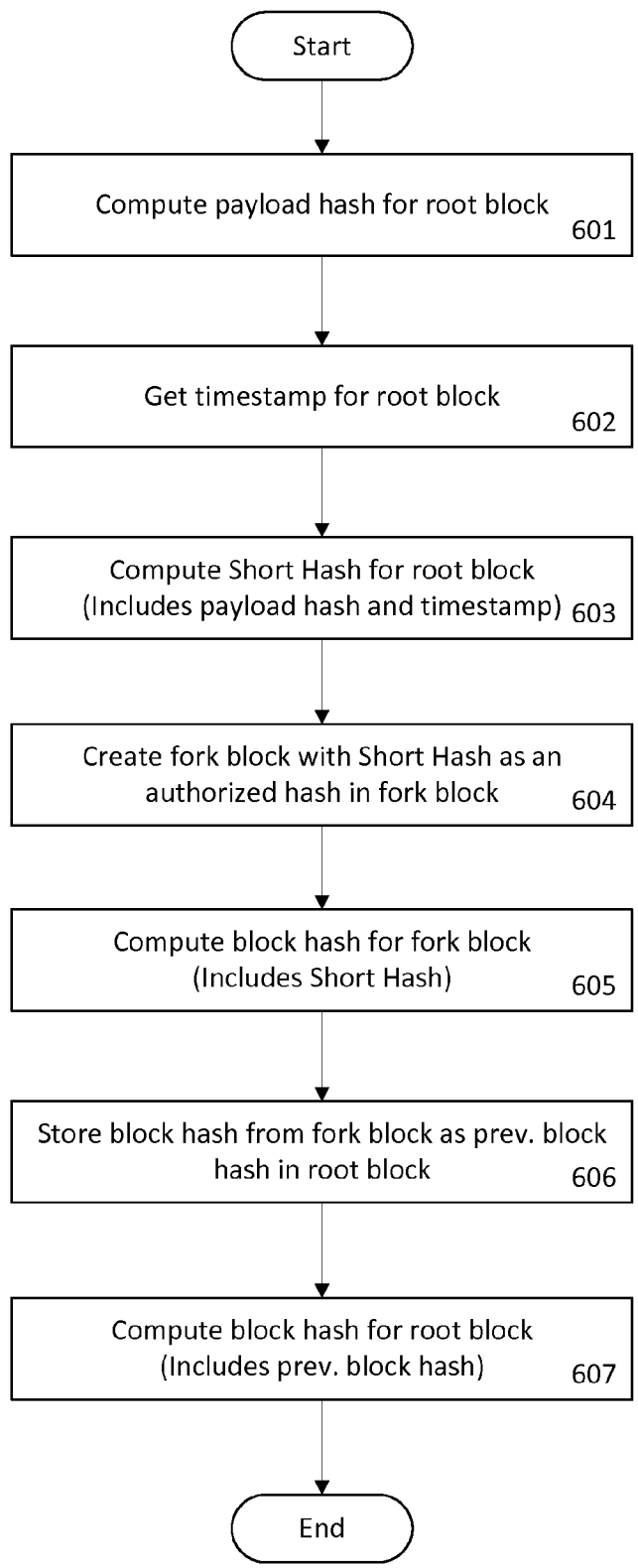
FIG. 6 is a flowchart showing the process for creating a fork in the slide chain according to an embodiment of the present invention.

According to an embodiment of the present invention, FIG. 6 shows a flowchart for the process of creating a valid slidechain fork. At step 601, the system computes the payload hash for the root block. The payload hash is a mathematical summary of the payload data and does not have to meet any proof standard. At step 602 the system gets a timestamp for the root block. The distributed network follows rules for accepting new blocks that require the timestamp to be within a certain range. A timestamp that appears to be spoofed or faked will result in rejection of the root block by the distributed network.

At step 603, the short hash is computed. The short hash uses at least the payload hash and timestamp as inputs, and may include other parts of the block as well. Including more parts of the block in the short hash improves the reliability and security of the slidechain by making it more difficult to spoof an apparently authorized chain fork. At step 604, the fork block is created with the short hash from the root block stored as the authorized hash in the fork block. At step 605, the block hash for the fork block is computed. The block hash must meet the proof standard stored in the fork block. This is accomplished by repeatedly adjusting the nonce until a hash is found that meets the proof standard.

At step 606, the block hash from the fork block is stored as the previous hash in the root block. This completes the two-way reference between the fork block and the root block, ensuring that the root block represents an authorized and valid fork from the fork block. At step 607, the root block is validated or finalized by finding a block hash that meets the proof standard stored in the root block. This concludes the explanation of the slidechain. Following is a description of voting system and method implementations which use a standard blockchain technology or slidechain technology.

According to an embodiment of the voting system described herein, each voter is assigned a cryptographic key pair comprising a private key and a public key generated through asymmetric cryptography. The system may use any algorithm or standard for generating a key pair including ECDSA (Elliptic Curve Digital Signature Algorithm), RSA (Rivest Shamir Adleman) algorithm, or any other current or future key generation algorithm. The particular method for generating a key pair is not critical to the present invention. One or ordinary skill in the art would recognize that any method of generating a cryptographic key pair could be used without departing from the present invention. The voter is given either a physical representation of the keys printed as a barcode which may be the ballot itself, or an electronic storage device holding the key pair. The public key is used to uniquely identify the votes cast by the voter, and the private key is used to apply a digital signature to the votes. Each key pair is granted a single vote in each race that the voter is authorized to vote in. When a ballot or key pair is used to cast a vote, the ballot or key pair expires and can no longer be used to cast additional votes.

The private key is used to produce a digital signature of the voting data submitted by the voter. The digital signature can be verified using the public key without accessing the private key. A voter cannot digitally sign the voting data that corresponds to another voter's public key. This prevents a malicious actor from being able to change the voting data for other voters. The most a voter could do, without obtaining private keys would be to change the voting data corresponding to his own private key, which is hardly likely to influence the outcome of an election, and would, in the end, simply represent his own vote in the election.

Figure 7:
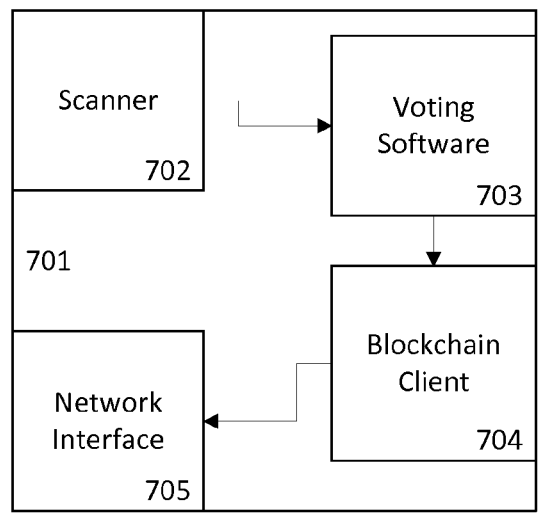
FIG. 7 is a block diagram of a voting machine according to an embodiment of the present invention.

FIG. 7 shows a block diagram of a proprietary voting machine 701 used in the present voting system according to an embodiment of the present invention. The voting machine 701 is a computerized system running software in conjunction with external hardware components, and includes a barcode scanner 702 for scanning data from a physical ballot. The voting machine includes a processor and computer readable memory loaded with voting software 703 and a proprietary blockchain client 704 software. The voting software receives the voting data from the voter by electronic input using a graphical interface, or through the scanner from the physical ballot, applies a digital signature to the voting data using the voter's private key. This signed voting data is passed to the blockchain client 704 which broadcasts the data to the distributed network through the network interface 705.

The voting data is packaged in a blockchain block and the block is solved to be added to the blockchain by finding a valid hash for the block as described above and in the parent application. The voting data may be packaged in a blockchain block before being broadcast to the distributed network, or the signed voting data may be broadcast naked. When the voting data is broadcast naked, one or more of the voting machines on the network will package the data into a blockchain block and find a valid hash so it can be added to the blockchain. Alternatively, the blockchain client and voting software can be combined into a single software bundle, or the duties of applying a digital signature, packaging the vote data in a data block, and finding a valid hash can be shared or accomplished by one or the other software component. One of ordinary skill in the art would recognize that either the voting software 703 or the blockchain client 704, or a third software component could assume any one or all of the steps described above.

Figure 8:
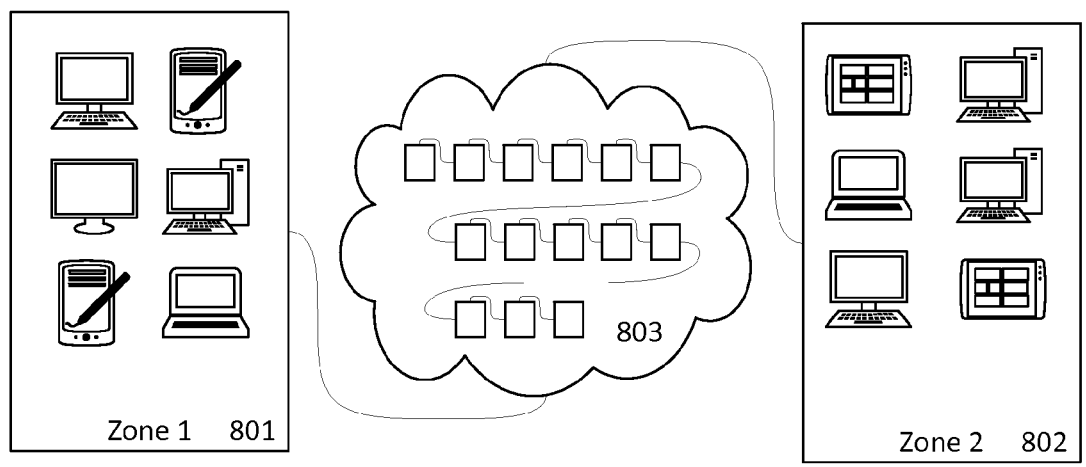
FIG. 8 is a network diagram of the distributed network of voting machines according to an embodiment of the present invention.

FIG. 8. Shows a network diagram of a distributed network of voting machines according to an embodiment of the present invention. Each voting machine is a node in the larger distributed network 803 connected through the internet and is capable of participating in accepting votes, and solving for new blocks on the blockchain. Alternatively voting machines may be added to the network with the sole purpose of solving for new blocks on the network. The voting data is broadcast to the whole network and all voting machines work simultaneously to solve the next block in the chain. According to one embodiment of the present invention, the voting machines are grouped into Zone 1 801 and Zone 2 802. Zone 1 801 and Zone 2 802 may be located in separate municipalities with separate races where the voters in one municipality cannot vote in the election of the other municipality. Alternatively the zones may be assigned to separate districts with their own local elections and a larger regional election occurring simultaneously.

There are a variety of ways that the blockchain could be organized when voting machines are distributed among different elections that are either overlapping or completely independent of each other. According to one embodiment, a separate blockchain is created for each election district. According to another embodiment, a separate blockchain is used for each race. In this embodiment, the local races would have their own blockchain, but a larger overlapping regional election would share a blockchain across Zone 1 801 and Zone 2 802. According to another embodiment, all voting data in all elections in all zones is stored on a single blockchain. Within Zone 1 801 and Zone 2 802, a variety of different voting machine configurations can be used. These different voting machine configurations can be based on a desktop PC, laptop, dummy terminal, mobile computer, or PDA. The voting machines in each zone may be produced by different manufacturers or owned by different voting machine equipment providers. Each voting machine follows a common protocol in communicating with the distributed network 803 and solving for new blocks on the one or more blockchains stored in the network.

According to one embodiment of the present invention, voting machines are configured to accommodate voting in the zone where they reside. For example, the voting machines will allow only votes cast in elections that the voter is allowed to vote in. Each voting machine may be preconfigured with the fields for state, county, municipality, election district, the district for each office for which an election is held and in which the voter resides and which district boundaries are not contiguous with either the municipal, county or state boundaries. Alternatively, The keypairs can and will be customized to the individual voter on data fields including, without limitation, the fields for state, county, municipality, election district, the district for each office for which an election is held and in which the voter resides and which district boundaries are not contiguous with either the municipal, county or state boundaries. These fields are stored in the blockchain as the voting data to designate which election each vote belongs to.

Figure 9:
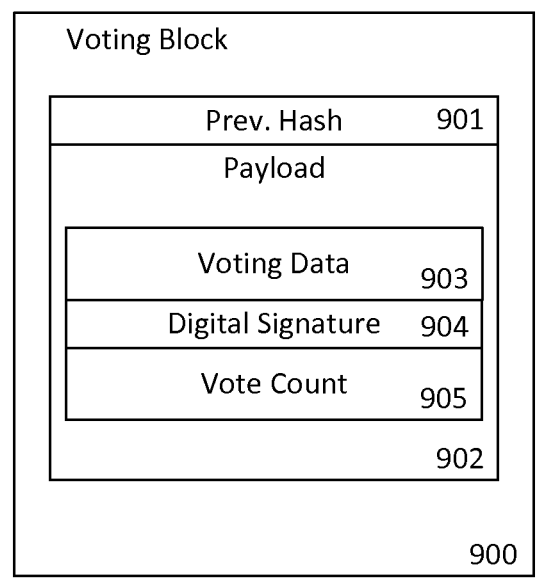
FIG. 9 is a diagram of a voting block of a blockchain according to an embodiment of the present invention.

FIG. 9 is a diagram of a voting block 900 on the blockchain according to an embodiment of the present invention. As with a standard blockchain, the voting block includes a hash of the previous block stored in the previous hash 901 of the block 900. In this embodiment, the voting data 903, the digital signature 904 of the voting data, and the updated voting count 905 are all stored in the payload 902 of the block.

Figure 10:
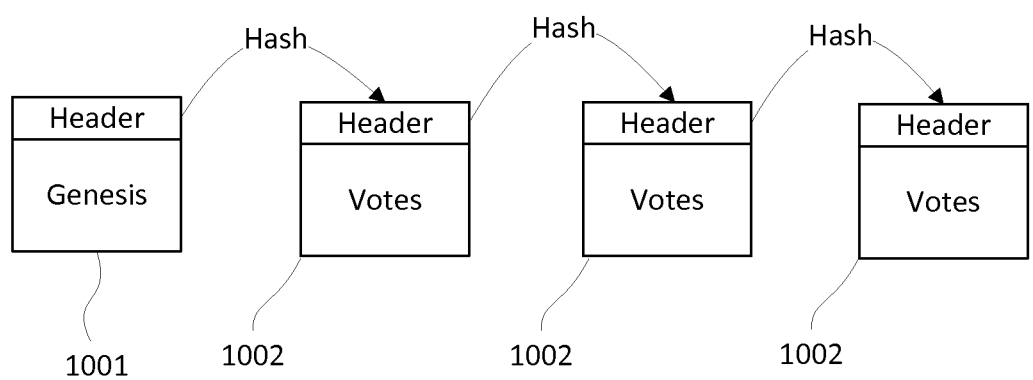
FIG. 10 is a diagram of a blockchain for storing voting data according to an embodiment of the present invention.

FIG. 10 shows a blockchain for storing voting data according to an embodiment of the present invention. The genesis block 1001 marks the beginning of the blockchain and may or may not store any voting data. Each voting block 1002 includes the hash of the preceding block and the votes of a single voter. Alternatively, votes from multiple voters, with their corresponding digital signatures can all be stored in the same voting block 1002.

In order to ensure that all the blocks can be solved within a reasonable amount of time after all votes have been cast, the difficulty of the proof standard can be adjusted and the maximum size of the blocks can be increased according to the number of voters voting in an election and the number of voting machines in use. For example, in a small municipal election, although only a handful of voting machines would be sufficient to receive every vote cast, additional voting machines can still be included in the distributed network from anywhere with an internet connection in order to help solve for blocks in the blockchain. As more voting machines participate in the distributed network, even if they are not directly used by voters, the difficulty of the proof standard can be increased without delaying the outcome of the election. As the difficulty of the proof standard is increased, it becomes more difficult for a malicious actor to take control of the network and improperly influence the election outcome or change results after the election is over. Therefore it is advantageous to use as many voting machines as possible on the distributed network even for a small election.

Figure 11:
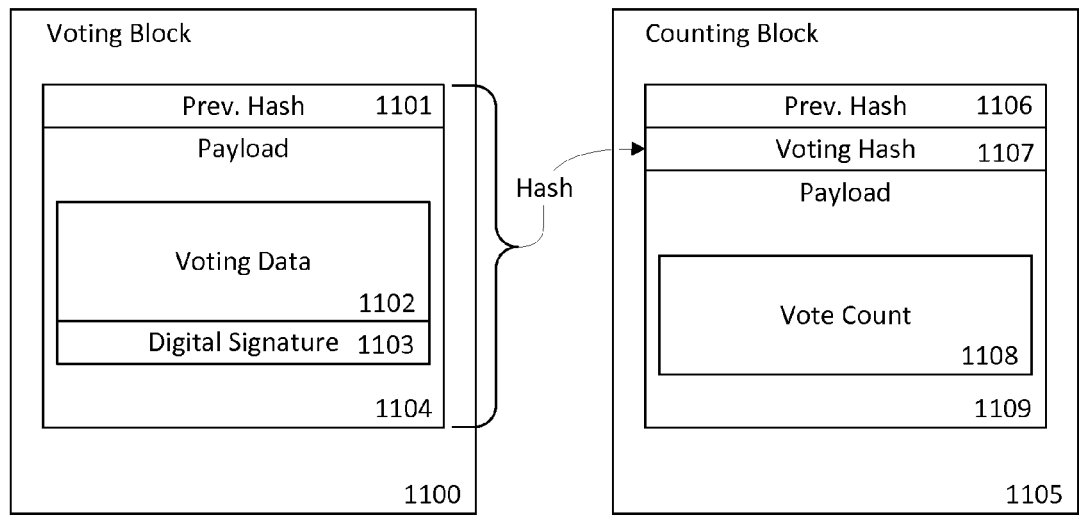
FIG. 11 is a diagram of the connection between a voting block and a counting block where a separate blockchain is used to count votes according to an embodiment of the present invention.

FIG. 11 shows the connection between a voting block and a corresponding counting block when two blockchains are used to store voting data and counting data according to an alternate embodiment of the present invention. Each voting block 1100 stores a hash of the previous voting block in the voting blockchain in the voting previous hash 1101; likewise, each counting block 1105 stores a hash of the previous counting block in the counting blockchain as the counting previous hash 1106. Each counting block 1105 in the counting blockchain additionally stores a hash of the voting block whose votes it uses to update the voting count. The voting payload 1104 stores the voting data 1102 and the digital signature 1103 of the voter that submitted the voting data 1102. The counting payload 1109 stores the updated voting count 1108 that results from the voting data stored in the voting block whose hash is stored in the voting hash 1107.

Figure 12:
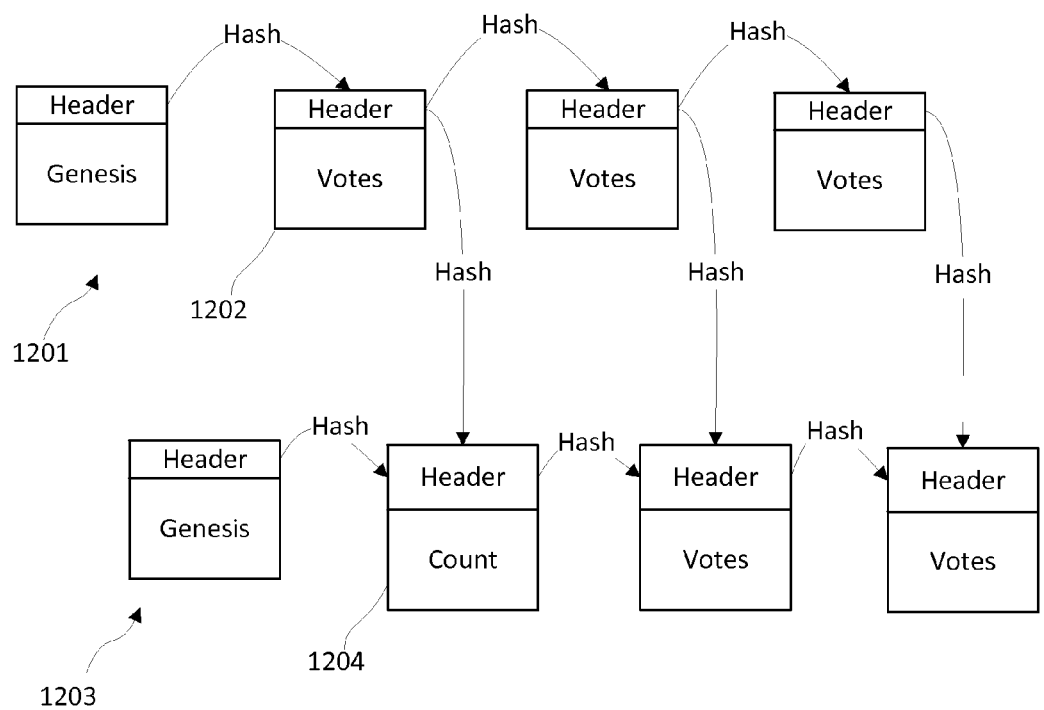
FIG. 12 is a diagram of a voting blockchain and counting blockchain interconnected according to an embodiment of the present invention.

FIG. 12 shows a voting blockchain 1201 and a counting blockchain 1203 which propagate in tandem. For each voting block 1202 added to the voting blockchain 1201, a counting block 1204 is created with a reference to the hash of the voting block 1202. The hash of each voting block 1202 is stored both in the next voting block and in a corresponding counting block 1204. The counting block 1204 adds the votes in the referenced voting block 1202 to the count and stores it in the counting payload 1109. This ties the counting block 1204 to a specific voting block 1202 and allows easy auditing of the votes stored in the voting blockchain 1201 and count stored in the counting blockchain 1203.

According to an embodiment of the present invention, the counting blockchain 1203 grows at exactly the same rate as the voting blockchain 1201. After each voting block 1100 is solved, the hash from that newly solved voting block 1100 is stored as the voting hash 1107 in the next counting block and the updated voting count is stored in the counting block payload 1109. The voting count is updated simply by reading the voting count of the previous counting block and updating the voting count according to the votes cast in the last voting block. Because the counting block includes a hash of the voting block, the counting block corresponding to a particular voting block is always solved after the voting block. This improves security by adding an additional layer of verification and increasing the computation that must be done in order to change data stored in the blockchain. For example, if a malicious actor somehow changes a vote in the voting blockchain, the hash will change, and break the link to the corresponding counting block in the counting blockchain, forcing the malicious actor to re-compute not only the voting blockchain, but the counting blockchain as well. If the malicious actor tries to modify only the counting blockchain, it will be readily apparent that the count does not correspond to the votes in the voting blockchain.

According to another embodiment of the present invention, the voting block need not have exactly the same number of blocks as the voting blockchain. Each counting block can simply reference the latest voting block and update the count based on every voting block created since the voting block referenced by the previous counting block. This will allow arbitrarily sized gaps between the voting blocks that are referenced by the counting blocks.

According to an embodiment of the present invention, the solving of counting blocks can be opened to the public, rather than relying solely on the computing power of the voting machines. A vote counting blockchain client may be provided which any user can install on their own computer and use to solve counting blocks. Since counting blocks only deal with information that has been securely stored in the voting blockchain, and do not need access to private keys, there is no security risk in allowing the public to participate in solving counting blocks. An incentive reward, such as digital coins, rewards points, or tax exemption points, may be provided to the user that solves each counting block. As the public distributed network solving for counting blocks grows larger, it becomes increasingly difficult for a malicious actor to tamper with voting data. Even if a malicious actor was able to spoof or otherwise obtain a large number of unused private keys and significantly alter the voting blockchain, managed by the voting machines, the size of the public distributed network solving the counting blockchain would make it prohibitively expensive to modify the counting blockchain to match the modified voting blockchain.

Figure 13:
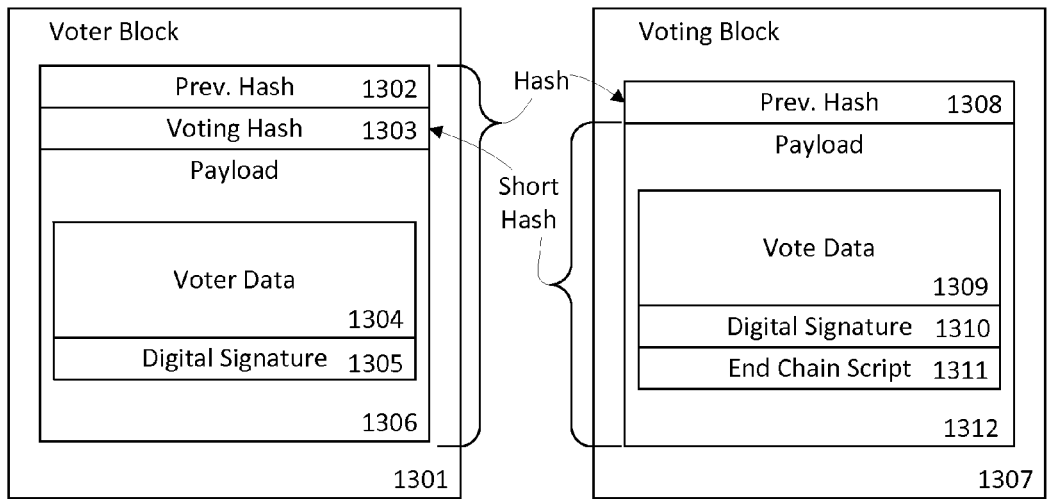
FIG. 13 is a diagram of a voter block and voting block implemented using a slidechain according to an embodiment of the present invention.

FIG. 13 is a diagram showing the connection between a voter block 1301 and a voting block according to an embodiment of the present invention using slidechain technology. Each voter block 1301 creates a fork from the root chain. The root chain is chain that extends from the genesis block without following a fork. The fork chains created with each voter block 1301 stores the voting data belonging to a voter identified in the voter block 1301 that created the fork chain. Therefore, each fork chain created by a voter block 1301 will only have a single block storing voting data.

The voter block 1301 stores the hash of the previous block as the voter previous hash 1302 and the hash of the valid fork as the voting hash 1303. The voter payload 1306 contains voter data 1304 identifying the voter, which may comprise the voter's public key, an identifier for each election in which the voter is allowed to cast a vote, state, county, municipality, election district, the district for each office for which an election is held and in which the voter resides and which district boundaries are not contiguous with either the municipal, county or state boundaries. A voter digital signature 1305 may also be applied to prevent unauthorized changes to the data in the voter payload 1306.

The voting block stores the voter block has as the voting previous hash 1308 and the voting payload 1312 is used, at least in part, to produce a short hash which is stored in the voter block as the voting hash 1303. The voting payload 1312 stores the actual vote data 1309 of the voter, with a voting digital signature 1310, and an end chain script 1311 which prevents further votes on the fork chain produced by the voter block 1301. The end chain script enforces the one vote per voter rule and prevents further votes from being cast on the fork chain.

Figure 14:
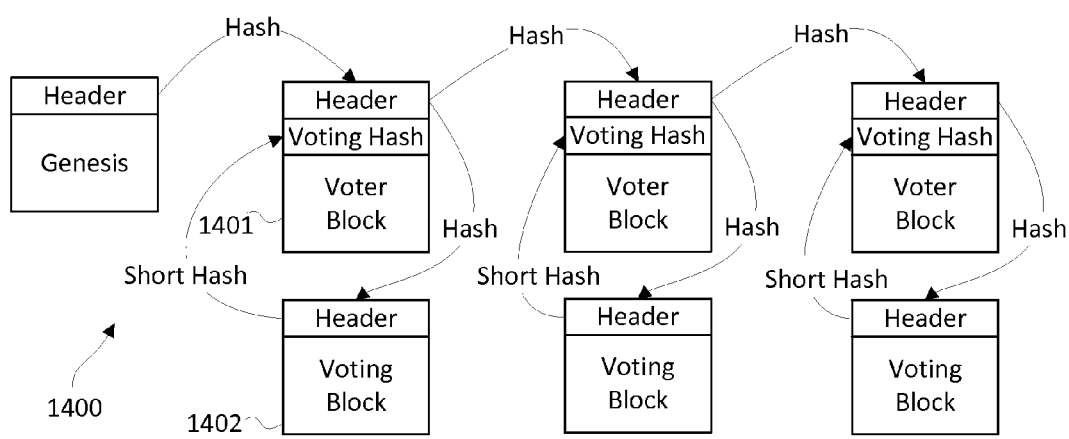
FIG. 14 is a diagram of a slidechain used to store voter and voting data according to an embodiment of the present invention.

FIG. 14 shows a diagram of the slidechain used to store voter data and voting data according to an embodiment of the present invention. The slidechain implementation has only a single blockchain 1400, but each voter block 1401 produces a fork in the chain where votes are stored for a particular voter. According to an embodiment of the present invention, the voter is identified in the voter block. Each fork contains only a single voting block 1402, which stores the votes cast by the voter identified in the voter block 1401.

Figure 15:
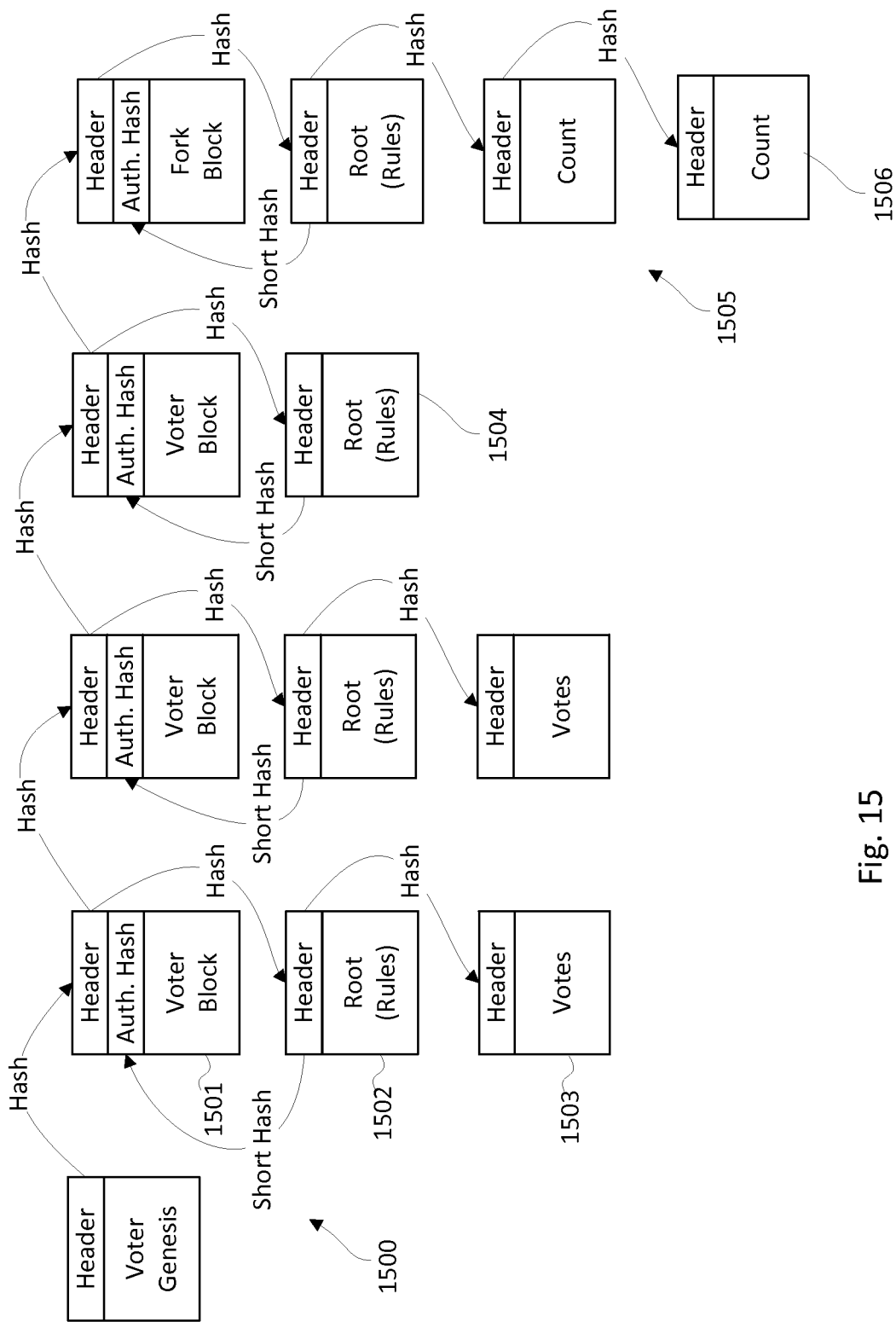
FIG. 15 is a diagram of a slidechain implementation of the voting system according to an alternate embodiment of the present invention.

FIG. 15 shows a diagram of the slidechain used to store voter data and voting data according to an alternate embodiment of the present invention. In order to create a valid fork chain, slidechain technology stores within the fork block a hash of at least part of the root block of a valid fork. The short hash is computed from the root block 1502, excluding the root block's 1502 previous hash. This short hash is stored in the voter block 1501, which acts as the fork block, completing the voter block 1501 and allowing the voter block 1501 hash to be computed. The voter block 1501 hash is then stored in the root block 1502, completing the root block 1502 and allowing the root block 1502 to be solved by finding a valid hash. This means that, at least according to one embodiment of the slidechain, the data stored in a root block 1502 must be known before the voter block 1501 can be completed.

According to one embodiment of the present invention, if the voting data is stored in a voting block 1503 chained to the root block 1502 rather than the root block itself, the slidechain can be used as a voter registration database. Voter data can be stored in the voter block for every registered voter and the rules that apply to the fork chains in the election are stored in the root blocks 1502. As long as the data for the election and the voter are known in advance, a voter block and root block can be computed or pre-mined in advance for every voter. When each voter casts a vote, the voting data will be stored on that voter's corresponding fork chain in a voting block 1503 that chains onto the root block 1502. Any voter that does not vote will leave an empty fork chain as shown where no voting block is chained to the root block 1504. Pre-mining blocks on the slidechain allows processing of the election to speed up because computing power can be concentrated on solving the voting blocks without having to solve the voter blocks and root blocks during the election.

According to an embodiment of the present invention, the voting count is updated using a counting chain 1505 which is a specific fork chain on the slidechain dedicated to updating the count in the election. Each time a voter casts a vote, a new counting 1506 block is added to the counting chain 1505 which adds the voter's votes to the voting count from the previous block in the counting chain 1505, and stores the updated voting count in a new counting block 1506 on the counting chain 1505.

Figure 16:
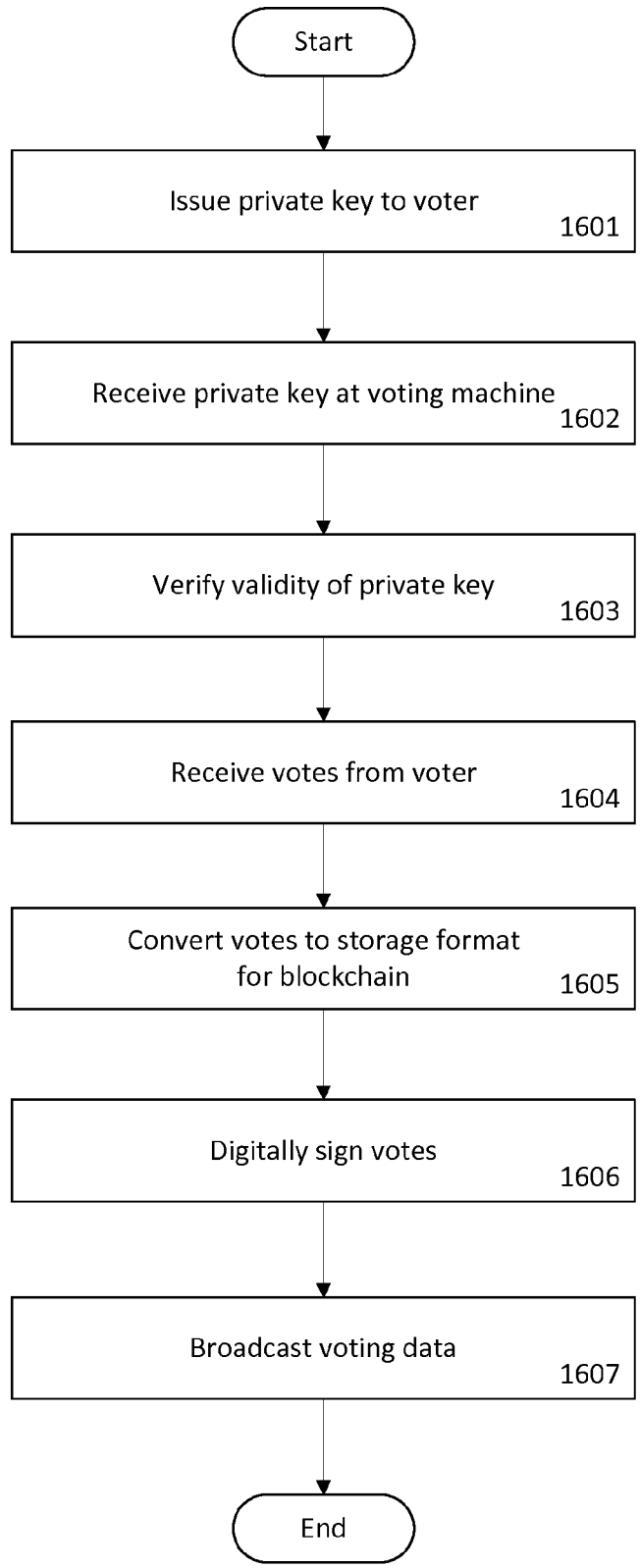
FIG. 16 is a flowchart of a voting process according to an embodiment of the present invention.

FIG. 16 shows a flowchart of a process for voting according to an embodiment of the present invention. It is assumed that at the start of the process shown in FIG. 16, the voter's identity has been verified and the voter is allowed to vote under whichever laws apply in the jurisdiction. At step 1601, the voter is issued a private key. This private key may be issued as a barcode printed on a piece of paper or another physical medium, a private key printed as a barcode on a physical ballot, or on an electronic medium such as a USB storage device, RFID device, or other computer readable medium.

At step 1602, the private key is received at the voting machine. If the private key is a barcode it is received through a scanner on the voting machine. If the private key is on an electronic storage medium, it is received through whatever means is appropriate for the electronic storage medium.

At step 1603, the validity of the private key is verified. Not just any private key can be used to vote. Otherwise, anyone could spoof votes simply by generating key pairs and using them to send votes to the distributed network. The voting machine checks to make sure the private key was issued through the proper authority, and has not yet been used.

At step 1604, the voting machine receives votes from the voter, this is done electronically through a graphical interface of the voting machine, or by scanning a physical ballot through the voting machine's scanner.

At step 1605, the votes are converted to a transaction format that is valid for storage on the blockchain. According to one embodiment, this involves storing the public key to uniquely identify the voter and the electronic identifiers of the candidates that the voter voted for. Typically the electronic identifiers of the candidates will also be public keys, but any identifier could be used to uniquely identify which candidates the voter voted for.

At step 1606, the voting data is digitally signed using the voter's private key. This signature is verifiable mathematically using the voting data and the voter's public key stored with the voting data. The digital signature prevents others from modifying the voting data and proves that the voting data was produced by the voter that holds the private key corresponding to the public key stored with the voting data.

At step 1607, the voting data is broadcast to the distributed network. Once the voting data is available to the distributed network, one or more of the voting machines that act as nodes on the distributed network can try to solve for the next block with the voting data included in the payload of the voting block.

According to an embodiment of the present invention, the voting system combines three different security systems, of which none can be compromised or disabled in the same way. The three systems are (a) a physical record through paper or other hard copy version of a voting ballot, (b) a cloud based protection which would use a computer interface and the internet to transfer results taken after the scanning of special, one-use-only ballots and offload them onto a cloud storage, and (c) storage on a customized blockchain or blockchain type apparatus. Results would be stored in each of these three media. However, vote counting should be done using the two computer media for the sake of timeliness. The paper record preservation can assist in auditing the vote and other records.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of a special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. In a preferred embodiment of the present invention, the data store may be a relational database, working in conjunction with a relational database management system (RDBMS) for receiving, processing and storing data. In the preferred embodiment, the data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

The functions and operations presented herein are not inherently related to any particular computer or other apparatus. It is possible to modify or customize general-purpose systems to be used with programs in accordance with the teachings herein, or it may prove convenient to construct more specialized apparatus to perform the required method steps. The required structure for a variety of these systems will be apparent to those of skill in the art, along with equivalent variations. In addition, embodiments of the invention are not described with reference to any particular programming language. It is appreciated that a variety of programming languages may be used to implement the present teachings as described herein, and any references to specific languages are provided for disclosure of enablement and best mode of embodiments of the invention. Embodiments of the invention are well suited to a wide variety of computer network systems over numerous topologies. Within this field, the configuration and management of large networks include storage devices and computers that are communicatively coupled to dissimilar computers and storage devices over a network, such as the Internet.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware specialized through computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:
1. A voting system comprising:
one or more voting machines connected to each other by network connections to form a distributed network;
wherein each of said one or more voting machines comprises:
a computer processor;
a non-volatile computer-readable memory;
a scanner configured to read data from barcodes and/or voting ballots; and
a network interface;
wherein the non-volatile computer-readable memory is configured with computer instructions configured to:
receive a private key and public key pair from a voter,
receive voting data comprising one or more votes for one or more candidates in an election,
use said private key to digitally sign said voting data to produce signed voting data,
broadcast said signed voting data with said public key to a distributed network,
store said signed voting data with said public key on a blockchain database managed by the one or more voting machines forming said distributed network,
store, in a voter block which is a fork block of a slidechain, voter data identifying the voter and elections in which said voter is allowed to cast votes,
store voting data from said voter in a voting block which is a slidechain root block storing a voter hash of said voter block,
wherein said voter block also stores a voting hash computed from data in said voting block, and
accept the longest chain on said slidechain as a valid chain and accept as valid a chain where any voter block stores a voting hash of a voting block which, in turn, stores a voter hash of said any voter block.

2. The system of claim 1 wherein said computer instructions are further configured to:
store voting data with said public key in a voting block on a voting blockchain;
update a voting count according to said voting data; and
store said voting count in a counting block on a counting blockchain, wherein each counting block also stores a hash of the voting block storing the voting data which was used to update the voting count, the result of which is stored in the counting block.

3. The system of claim 1 wherein said computer instructions are further configured to:
update a voting count according to said voting data;
store said voting count in a counting block on a counting chain which is a fork chain of said slidechain, and
wherein each counting block in said counting chain also stores a hash of an immediately preceding counting block.

4. The system of claim 1 wherein said computer instructions are further configured to:
store, in a voter block which is a fork block of a slidechain, voter data identifying the voter and elections in which said voter is allowed to cast votes,
create a slidechain root block storing a voter hash of said voter block,
store, in said voter block, a root hash computed from data in said root block,
store said voting data in a voting block,
store said root hash in said voting block, and
accept the longest chain on said slidechain as a valid chain and accept, as valid, a chain where any voter block stores a root hash of a root block which, in turn, stores a voter hash of said any voter block.

5. The system of claim 1 wherein said computer instructions are further configured to:
update a voting count according to said voting data;
store said voting count in a counting block on a counting chain which is a fork chain of said slidechain, and
wherein each counting block in said counting chain also stores a hash of an immediately preceding counting block.

6. A computer implemented method of securing voting data comprising the steps of:
receiving a private key and public key pair from a voter,
receiving voting data comprising one or more votes for one or more candidates in an election,
using said private key to digitally sign said voting data to produce signed voting data,
broadcasting said signed voting data with said public key to a distributed network, storing said signed voting data with said public key on a blockchain database managed by the one or more voting machines forming said distributed network, storing, in a voter block which is a fork block of a slidechain, voter data identifying the voter and elections in which said voter is allowed to cast votes, storing voting data from said voter in a voting block which is a slidechain root block storing a voter hash of said voter block, wherein said voter block also stores a voting hash computed from data in said voting block, and accepting the longest chain on said slidechain as a valid chain and accepting as valid a chain where any voter block stores a voting hash of a voting block which, in turn, stores a voter hash of said any voter block.

* * * * *